US012601345B2

(12) United States Patent
Kiełczykowski et al.

(10) Patent No.: US 12,601,345 B2
(45) Date of Patent: Apr. 14, 2026

(54) MODE SELECTION VALVE FOR RAT RE-STOW PUMP

(71) Applicant: Hamilton Sundstrand Corporation, Charlotte, NC (US)

(72) Inventors: Przemysław Kiełczykowski, Kiełczów (PL); Damian Adam Słodczyk, Wrocław (PL); Janusz Michał Sarosiek, Wrocław (PL); Piotr Michał Bereszyński, Głogów (PL); Tomasz Marek Skórka-Siemieński, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 12 days.

(21) Appl. No.: 18/442,318

(22) Filed: Feb. 15, 2024

(65) Prior Publication Data

US 2024/0288010 A1     Aug. 29, 2024

(30) Foreign Application Priority Data

Feb. 23, 2023     (EP) ..................................... 23461521

(51) Int. Cl.
*F04B 53/10* (2006.01)
*B64D 41/00* (2006.01)
(Continued)

(52) U.S. Cl.
CPC ............ *F04B 53/10* (2013.01); *B64D 41/007* (2013.01); *F04B 7/0046* (2013.01);
(Continued)

(58) Field of Classification Search
CPC .... F15B 15/1476; F04B 7/0046; F04B 53/10; F16K 5/0414; F16K 5/0442; F16K 31/003; F16K 31/563; B64D 41/007
See application file for complete search history.

(56) References Cited

U.S. PATENT DOCUMENTS

| | | | |
|---|---|---|---|
| 3,782,681 A | 1/1974 | Blackstein | |
| 10,006,476 B2 * | 6/2018 | Bannon | ................ B64D 41/007 |

(Continued)

FOREIGN PATENT DOCUMENTS

| | | |
|---|---|---|
| CN | 201795079 U | 4/2011 |
| EP | 3078595 A1 | 10/2016 |
| EP | 3865407 A1 | 8/2021 |

OTHER PUBLICATIONS

Abstract CN201795079 (U), Published: Apr. 13, 2011, 1 page.
European Search Report for Application No. 23461521.9, mailed Jul. 28, 2023, 8 pages.

*Primary Examiner* — Michael Leslie

(74) *Attorney, Agent, or Firm* — CANTOR COLBURN LLP

(57) ABSTRACT

A mode selection valve assembly includes a first end having a housing and an operating end located within the housing and rotatable relative thereto on application of a rotary force by a user. The assembly also includes a conduit end fixed to rotate with the operating end. The conduit end is formed by a cylindrical wall defining a conduit therethrough and an opening formed through the wall in fluid communication with the conduit. The assembly also includes, a rotary spring secured in the housing and connected at a first end to the housing and at a second end to the operating end. The spring is configured to rotationally bias the operating end to a first rotational position relative to the housing such that the opening of the conduit end is at a first rotary position relative to the housing.

20 Claims, 5 Drawing Sheets

(51) Int. Cl.
  F04B 7/00 (2006.01)
  F16K 5/04 (2006.01)
  F16K 31/00 (2006.01)
  F16K 31/56 (2006.01)

(52) U.S. Cl.
  CPC .......... F16K 5/0414 (2013.01); F16K 5/0442 (2013.01); F16K 31/003 (2013.01); F16K 31/563 (2013.01)

(56) References Cited

U.S. PATENT DOCUMENTS

| | | | | |
|---|---|---|---|---|
| 10,113,568 | B2 * | 10/2018 | Bannon | F15B 15/14 |
| 10,214,297 | B2 | 2/2019 | Larson, Jr. et al. | |
| 11,858,650 | B2 * | 1/2024 | Konicek | F15B 15/202 |
| 12,191,075 | B2 * | 1/2025 | Kiełczykowski | H01F 7/14 |
| 2016/0039532 | A1 | 2/2016 | Larson, Jr. et al. | |
| 2018/0050813 | A1 * | 2/2018 | Larson, Jr. | B64D 41/007 |
| 2021/0253266 | A1 | 8/2021 | Konicek et al. | |
| 2024/0287951 | A1 * | 8/2024 | Kiełczykowski | F04B 53/1007 |
| 2025/0016268 | A1 * | 1/2025 | Li | H04M 1/2748 |

* cited by examiner

MODE SELECTION VALVE

RESTOW PUMP

STOW

ARM

90°

70

ID GETC-6

MODE SELECTION VALVE FOR RAT RE-STOW PUMP

CROSS REFERENCE TO RELATED APPLICATIONS

This application claims priority to European Patent Application No. 23461521.9 filed Feb. 23, 2023, the entire contents of which is incorporated herein by reference.

TECHNICAL FIELD

The disclosure is concerned with a mode selection valve for a pump assembly for retracting or re-stowing a ram air turbine, RAT, of an aircraft.

BACKGROUND

Ram air turbines, RATs, are small emergency turbines that may be provided in the fuselage or wing of an aircraft to be deployed in the case of failure of a main engine to provide emergency power. The RAT may be manually or automatically deployed, by means of a RAT actuator, into an airstream of the aircraft and rotates in the airstream to generate power for the aircraft. Once deployed, the RAT or RAT actuator is locked in the deployed position by a locking pin or mechanism to avoid the RAT being inadvertently pushed back into the retracted or stowed position by e.g. air forces. Typically, it is not possible to retract/re-stow the RAT during flight and the re-stowing is performed as a ground operation using a hydraulic re-stow pump assembly to provide hydraulic fluid to the RAT actuator to cause it to move in the re-stow direction.

A RAT actuator typically comprises a piston movably located within a hydraulic cylinder. To deploy the RAT, hydraulic fluid is provided to one side of the piston in the cylinder to extend the piston from the cylinder, the free end of the piston being connected to the RAT to deploy the RAT from the body of the aircraft where it has been stowed.

The re-stow pump is attached to the actuator assembly to provide hydraulic fluid from a fluid supply e.g. a tank or the aircraft fluid supply, to the cylinder on the other side of the piston to retract the piston back into the cylinder and thus to stow the RAT.

RAT re-stow pumps typically have a mode selection valve for switching the pump between its normal or 'ARM' mode in which it does not pump fluid from the supply to the RAT actuator, and its 'STOW' mode in which fluid lines from the fluid supply are fluidly connected to the fluid lines controlling movement of the piston of the RAT actuator to cause the actuator to stow the RAT. The default position of the mode selection valve is the ARM mode and safety standards require that the mode selection valve return quickly (e.g. within 50 s) from the STOW mode to the ARM mode.

The mode selection valve is typically a rotary valve which is moved between the ARM position and the STOW position by maintenance personal physically tuning the valve e.g. using a lever or handle attached to the valve body. This can be quite physically demanding and require several rotational movements of the heavy mechanical component between the two positions to perform the required operation.

There is a desire for a simple mode selection valve that is more convenient to operate whilst still satisfying safety standards.

SUMMARY

According to the disclosure there is provided a mode selection valve assembly for a RAT re-stow pump, the mode selection valve assembly comprising a first end having a housing and an operating end located within the housing and rotatable relative thereto on application of a rotary force by a user, the assembly further comprising a conduit end fixed to rotate with the operating end, the conduit end formed by a cylindrical wall defining a conduit therethrough and an opening formed through the wall in fluid communication with the conduit, and the assembly further comprising a rotary spring secured in the housing and connected at a first end to the housing and at a second end to the operating end, the spring configured to rotationally bias the operating end to a first rotational position relative to the housing such that the opening of the conduit end is at a first rotary position relative to the housing, and wherein rotational force applied by a user to the operating end against the force of the spring causes rotation of the conduit end and the opening therein to a second rotational position, the spring loaded to return the conduit end to the first rotational position on release of the applied force

BRIEF DESCRIPTION OF THE FIGURES

Examples of the mode selection valve assembly according to the disclosure will now be described in detail with reference to the drawings. It should be noted that these are examples only and that variations are possible within the scope of the claims.

DETAILED DESCRIPTION

Figure 1:
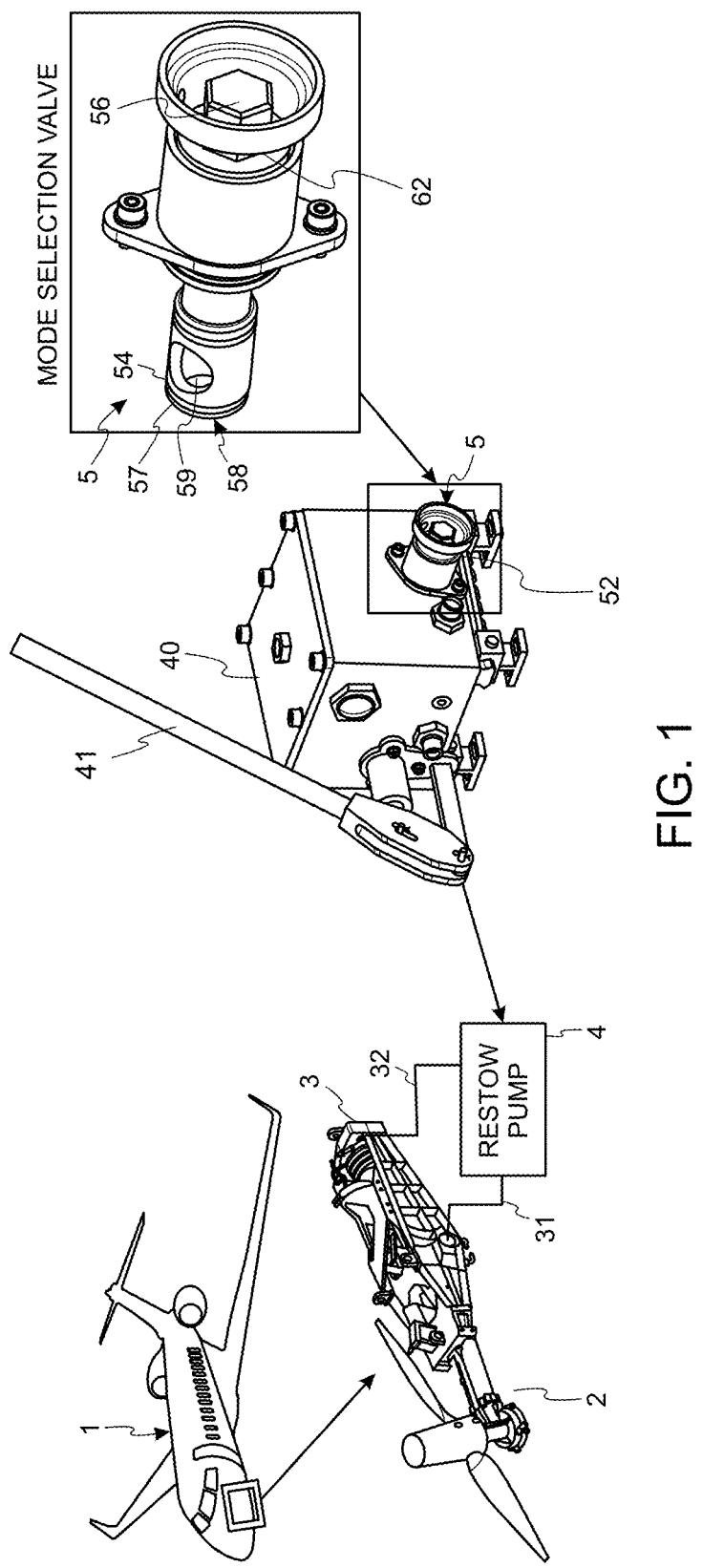
FIG. 1 is a schematic view showing a re-stow pump for use with a RAT on an aircraft and having a mode selection valve according to the disclosure.

Referring first to FIG. 1 to better explain the context of the mode selection valve of the disclosure, an aircraft 1 is shown having a RAT 2 which is usually stowed inside the aircraft fuselage, typically on the underside of the aircraft. The RAT is provided with an actuator 3, typically a hydraulic actuator, which operates to extend (deploy) the RAT out of its stowed position when required. When extended, the RAT rotates in the airstream to generate emergency power for the aircraft. The RAT and RAT actuator will not be described further in any detail as these are well-known to those skilled in the art and do not, per se form part of the present disclosure which is concerned with the mode selector valve of the re-stow pump for any known type of RAT/RAT actuator.

Once the aircraft has landed, the RAT can be re-stowed. On some aircraft, this may be performed by an electrical system, but typically, the RAT is re-stowed using a hydraulic pump assembly 4 that is attached, by ground/maintenance staff to the fluid lines 31, 32 of the RAT actuator 3. The pump assembly includes a supply of hydraulic fluid (e.g. in a tank (not shown) inside the pump housing 40, or an external fluid supply or, even, the aircraft hydraulic system) that can be pumped from a pump piston (not shown-inside the pump housing) on actuation of the pump lever 41, via ports 42, 44 in the pump housing, into the RAT actuator, via the fluid lines 31, 32 to move the RAT to the stowed position. For reasons of safety, the pump has to actually be brought into a STOW mode from its default ARM mode before fluid can be pumped from it to the RAT actuator. A mode selection valve 5 is provided in the pump to rotate between the ARM mode and the STOW mode. The valve comprises a housing 51 within which is provided an operation end 52 of the mode selection valve which is rotatable relative to the housing 51. The housing 51 extends out of the pump housing 40 and is open to the rotatable operation end 52 so that the operation end can be physically rotated, relative to the valve housing 51, by maintenance staff. Safety standards require the mode selection valve to return to the default, ARM position, from the STOW position after a predetermined time e.g. 50 seconds.

The operation end 52 is preferably provided with a form of engagement means 56 e.g. for engagement by a wrench or other tool (see later) to provide leverage for the operator to rotate the valve more easily.

The other end 54 of the mode selection valve is inside the pump housing 40 in the fluid path from the fluid supply as will be explained further below. This comprises a rotatable hollow conduit 58 defined by a conduit wall, having an open end 57 and an opening 59 in the conduit wall that opens into the conduit.

The principle of operation of the mode selection valve will be described in more detail now with reference to FIGS. 2 to 4.

Figure 2:
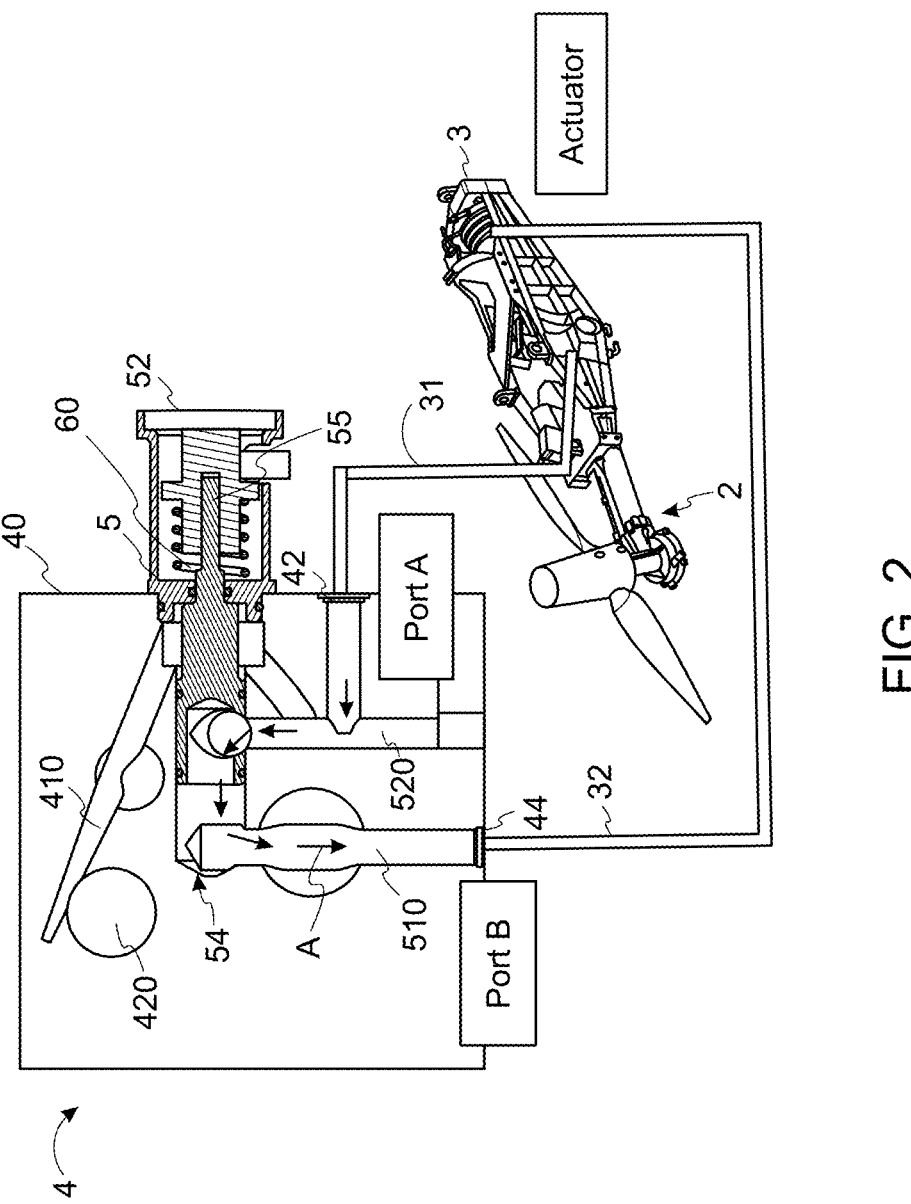
FIG. 2 is a schematic view showing the flow paths when a mode selection valve such as shown in FIG. 1 is in the ARM mode.
Figure 3:
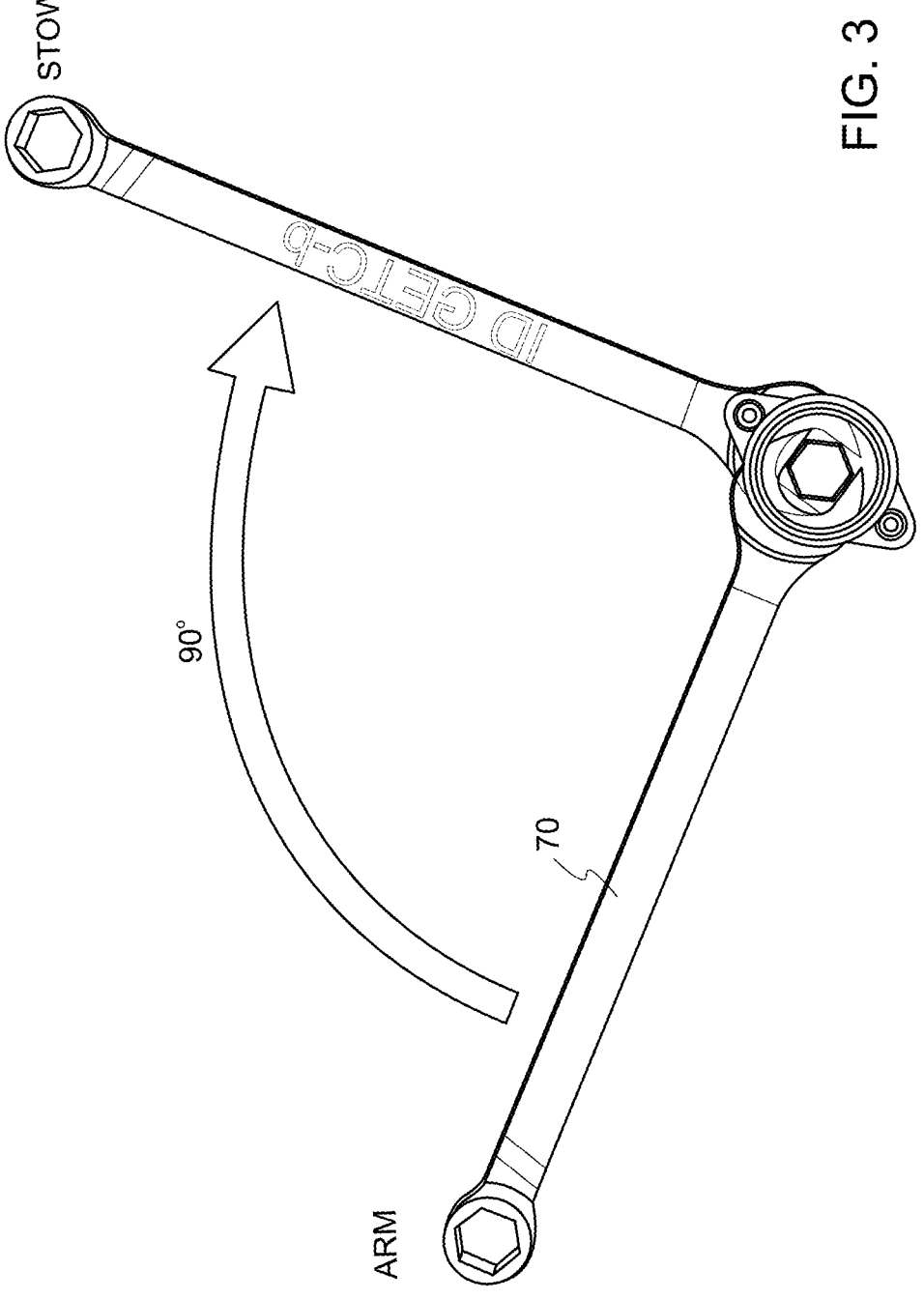
FIG. 3 illustrates one way of rotating the mode selection valve to the stow position.
Figure 4:
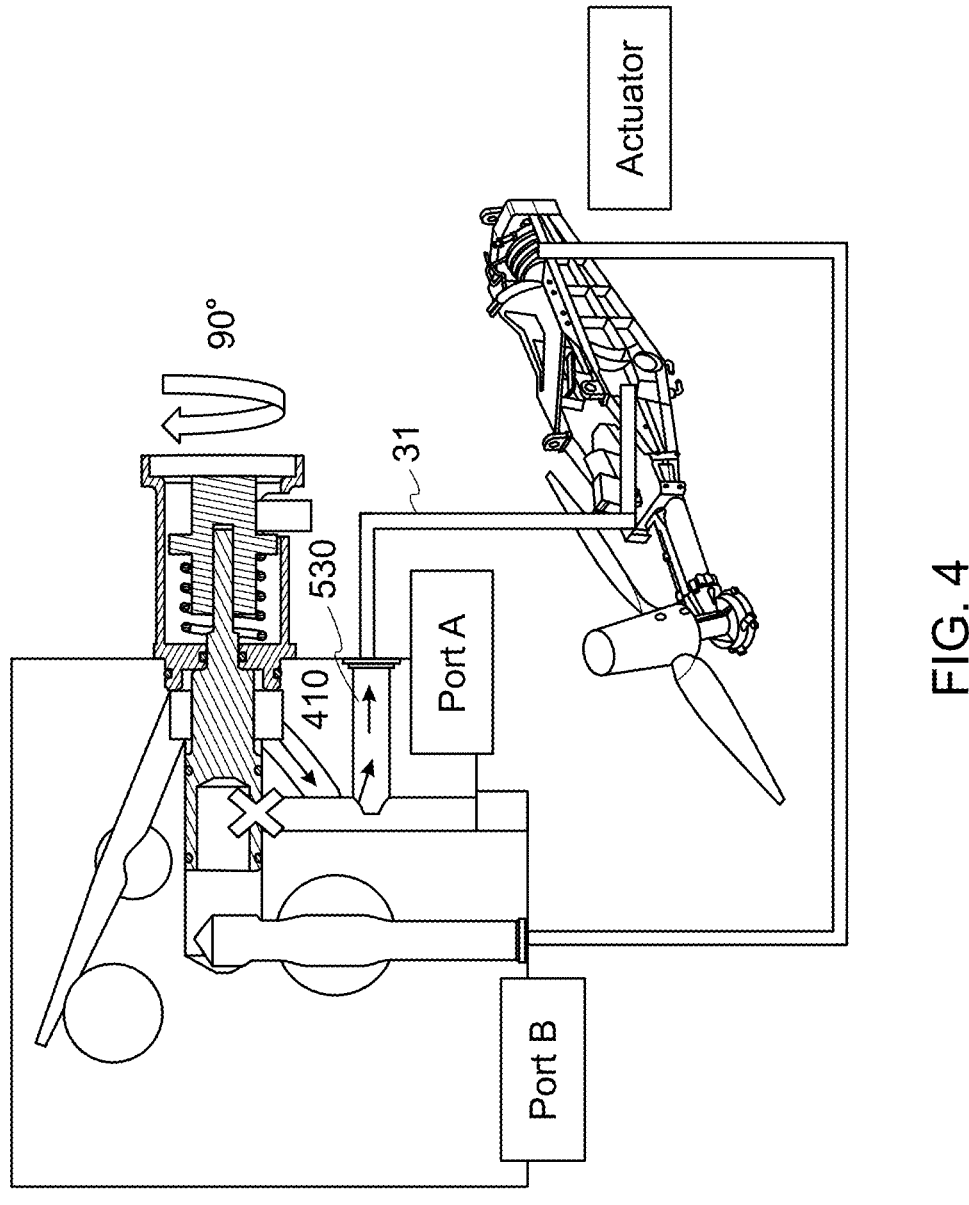
FIG. 4 is a schematic view showing the flow paths when a mode selection valve such as shown in FIG. 1 is in the STOW mode.

As can be seen in FIGS. 2 and 4, a pump fluid supply line 410 is provided which is connected to the pump fluid supply (e.g. a tank schematically represented by reference 420. Fluid flows along this line 410 when required to provide pump fluid to re-stow the RAT as described further below. The pump also includes flow passage 510 and return passage 520 in fluid connection, respectively, with ports 44 and 42 in the pump housing which are connected to supply and return lines 32, 31 of the RAT actuator.

FIG. 2 shows the pump in the default or 'ARM' position. In this position, the mode selector valve conduit 54 is in a rotational position such that the flow passage and return passage 510, 520 are respectively in fluid communication with the open end 57 of the conduit and the opening 59 in the valve conduit wall. The body of the valve conduit is therefore rotated such that the opening 59 in its wall is in connection with a fluid line to the RAT actuator, and the flow path is between ports 42 and 44 and the tank. The path of fluid flow through the valve in this position is indicated by arrows A and it can be seen that the flow is of hydraulic fluid from the return line 31 of the RAT actuator 3 and also from the tank 420 supply line 410, through the valve conduit 58 via the opening 59 and out of the conduit at the open end 54 which is fluidly connected to the supply line 32 of the RAT actuator. This continuous loop keeps a supply of fluid applied to the RAT actuator chamber forcing the RAT actuator piston in the extended state to keep the RAT in the deployed state.

A rotary spring 60 inside the mode selection valve is fixed at one end to the rotatable operating end 52 of the valve and at its other end to the valve outer housing 51. The rotatable operating end 52 is rotationally fixed to the conduit end 54, so that rotation of the operating end causes rotation of the conduit end. The spring is arranged to rotationally bias the conduit end to the ARM mode rotation position shown in FIG. 2. In the example shown, a shaft 55 extends from the conduit into the operating end 52 of the valve and the spring is mounted around the shaft in the operating end and secured to the valve housing 51 and also to the rotatable operating end and, therefore, to the shaft 55. Different ways of securing the spring and also of securing the rotatable operating end to the conduit end would be available to those skilled in the art. All that is necessary is that the spring is rotationally biased to hold the operating end and, therefore, the conduit end in its default position in the rotational position shown in FIG. 2 to define the fluid path from and back to the RAT actuator via the conduit. A physical effort is therefore required to rotate the operating end 52, and therefore the valve, against the force of the spring 60 out of the ARM position into a position where fluid can be pumped to the RAT actuator to move it to the stowed position.

The physical effort is applied to the operating end of the valve to rotate it. In one example, this may be done by attaching a wrench 70 (e.g. a hexagonal wrench) to the operating end, here a hexagonal engagement bolt 56, and rotating the wrench e.g. by 90 degrees to correspondingly rotate the operating end of the valve. The operating end may be provided with a form of stop e.g. a wrench inlet slot 62 that prevents the wrench being rotated beyond a given degree of rotation. Rotation of the operating end in turn rotates against the force of the spring 60 and causes rotation of the conduit end 54 of the valve to the STOW mode position shown in FIG. 4.

In the STOW mode position, the opening 59 is not aligned with the passage 520 and this passage is therefore closed (see X) and so fluid cannot flow into the opening 59 to the conduit and out through the conduit open end to port 44. Instead, fluid flows from the supply line 410 (from the fluid supply e.g. a tank 420) through branch line 530 into the RAT actuator return line 31 to provide fluid to the end of the actuator piston causing it to begin to retract in the stow direction. So long as the operator keeps applying force to hole the valve in the STOW mode rotational position, against the return force of the spring, hydraulic fluid will flow to the retract chamber of the RAT actuator to stow the RAT.

When the operator lets go of the wrench/stops applying rotational force to the valve, the rotary spring 60 acts to return the valve operating end and conduit end to the default ARM mode position (FIG. 2). The spring is designed to ensure that the valve returns to the ARM position within 50 seconds of the opposite rotational force being released, to satisfy safety standards. Because of the return force of the spring, therefore, the operator does need to keep applying effort to hold the valve in the STOW mode position.

Figure 5:
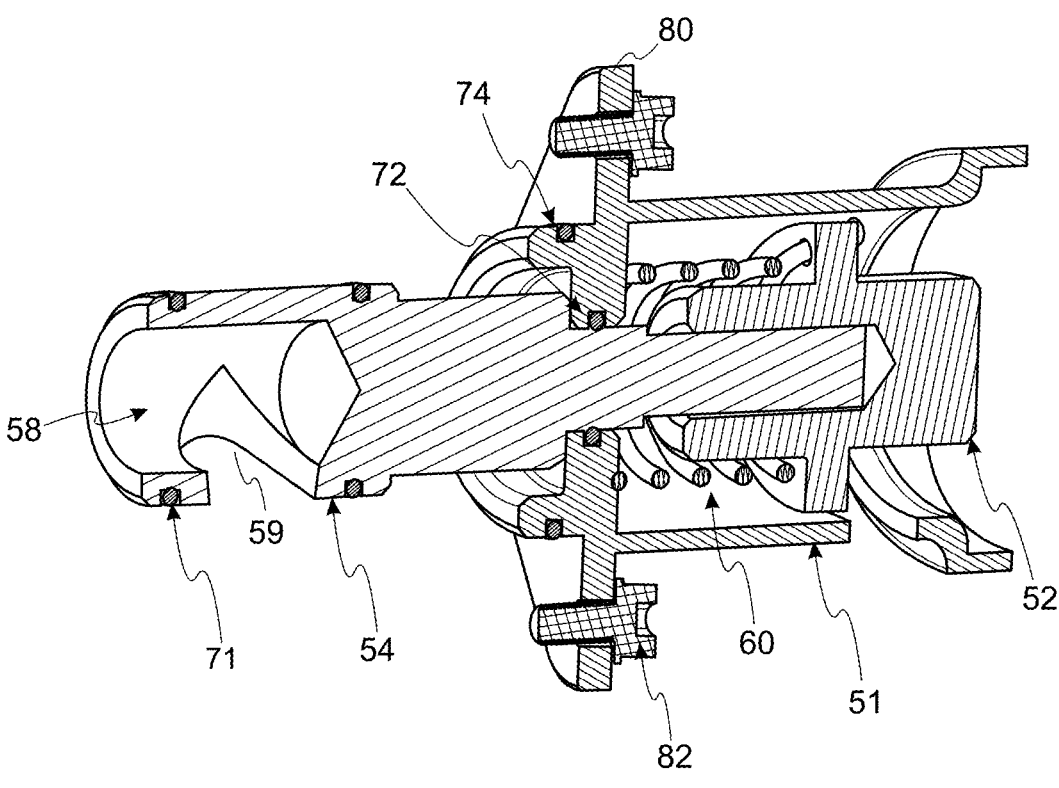
FIG. 5 is a sectional view of a mode selection valve according to the disclosure.

The components of the mode selection valve are shown in more detail in FIG. 5. The valve housing 51 is preferably provided with some means for securing it to the pump housing e.g. a flange 80 having holes through which fasteners 82 such as screws may be fastened.

Seals 71, 72, 74 may be provided at various locations in the valve to secure against leakage of fluid.

The mode selection valve according to this disclosure provides a reliable and simple to use and assemble rotary valve for a re-stow pump which is smaller and lighter than existing selector vales.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A mode selection valve assembly comprising:
a first end having a housing and an operating end located within the housing and rotatable relative thereto on application of a rotary force by a user;
a conduit end fixed to rotate with the operating end, the conduit end formed by a cylindrical wall defining a conduit therethrough and an opening formed through the wall in fluid communication with the conduit; and
a rotary spring secured in the housing and connected at a first end to the housing and at a second end to the operating end, the spring configured to rotationally bias the operating end to a first rotational position relative to the housing such that the opening of the conduit end is at a first rotary position relative to the housing;
wherein rotational force applied by a user to the operating end against the force of the spring causes rotation of the conduit end and the opening therein to a second rotational position, the rotary spring pre-loaded to return the conduit end to the first rotational position on release of the applied force;
wherein the mode selection valve assembly is configured to be mounted between a pressurized fluid inlet and a pressurized fluid outlet of a pump unit of a RAT actuator assembly.

2. The mode selection valve assembly as claimed in claim 1, wherein the conduit end and the operating end are connected to each other via a shaft.

3. The mode selection valve assembly of claim 2, wherein the rotary spring is mounted around the shaft.

4. The mode selection valve of claim 1, further comprising:
engagement means at the operating end via which a user can apply the rotary force.

5. The mode selection valve assembly of claim 4, wherein the engagement means is configured to be engaged by a tool.

6. The mode selection valve assembly of claim 5, wherein the engagement means is a bolt configured to be engaged by a wrench.

7. The mode selection valve assembly of claim 6, wherein the bolt is a hexagonal bolt.

8. The mode selection valve assembly of claim 5, wherein the operating end housing has a slot formed therein to receive and limit rotary motion of the tool.

9. The mode selection valve assembly of claim 1, further comprising:
an attachment flange.

10. A pump unit comprising:
a pump housing having a pressurized fluid inlet and a pressurized fluid outlet; and
a mode selection valve assembly as claimed in claim 1;
wherein the mode selection valve assembly is located between the pressurized fluid inlet and the pressurized fluid outlet;
wherein the mode selection valve assembly is mounted such that the conduit end is inside the housing between the pressurized fluid inlet and the pressurized fluid outlet, and the operating end extends out of the pump housing.

11. A ram air turbine (RAT) actuator assembly comprising:
a RAT actuator; and
a pump unit as claimed in claim 10 connected to the fluid outlet of the mode selection valve assembly.

12. A RAT actuator assembly of claim 11 in combination with a RAT and arranged to stow the RAT.

13. An aircraft having a RAT assembly as claimed in claim 12.

14. The pump unit of claim 10, wherein the conduit end and the operating end are connected to each other via a shaft.

15. The pump unit of claim 14, wherein the conduit end and the operating end are connected to each other via a shaft, wherein the rotary spring is mounted around the shaft.

16. The pump unit of claim 10, further comprising:
engagement means at the operating end via which a user can apply the rotary force.

17. The pump unit of claim 16, wherein the engagement means is configured to be engaged by a tool.

18. The pump unit of claim 17, wherein the engagement means is a bolt configured to be engaged by a wrench.

19. The pump unit of claim 18, wherein the bolt is a hexagonal bolt.

20. The pump unit of claim 19, wherein the operating end housing has a slot formed therein to receive and limit rotary motion of the tool.

* * * * *